United States Patent
Laginess et al.

[11] Patent Number: 5,836,637
[45] Date of Patent: Nov. 17, 1998

[54] REVERSIBLE VEHICLE FLOOR PANEL

[75] Inventors: Ernest J. Laginess, Clarkston; Walter W. Frisbie, Lake Orion; Allen G. Hicks, Allenton, all of Mich.

[73] Assignee: Chrysler Corporation, Auburn Hills, Mich.

[21] Appl. No.: 941,819

[22] Filed: Oct. 1, 1997

[51] Int. Cl.[6] .................................................. B62D 43/00
[52] U.S. Cl. .......................................... 296/75; 296/37.14
[58] Field of Search .................................. 296/75, 37.14, 296/191; 180/90.6

[56] References Cited

U.S. PATENT DOCUMENTS

| | | | |
|---|---|---|---|
| 1,496,569 | 6/1924 | Germeten et al. | 296/75 |
| 2,341,080 | 2/1944 | Burkholder | 296/75 |
| 4,310,193 | 1/1982 | Kolleas | 296/75 |
| 4,955,658 | 9/1990 | Graves | 296/75 |
| 5,061,002 | 10/1991 | Saso | 296/37.14 |
| 5,183,308 | 2/1993 | Koga et al. | 296/75 |
| 5,257,846 | 11/1993 | Kanai et al. | 296/37.14 |
| 5,482,346 | 1/1996 | Lesourd | 296/66 |

FOREIGN PATENT DOCUMENTS

| | | |
|---|---|---|
| 0419788A2 | 3/1991 | European Pat. Off. . |
| 0751038A2 | 2/1997 | European Pat. Off. . |

*Primary Examiner*—Joseph D. Pape
*Attorney, Agent, or Firm*—William J. Coughlin

[57] ABSTRACT

A reversible floor panel for making the rear seat floor area adjustable in a passenger vehicle. The reversible floor panel is formed with a planar surface on one side and an extended surface on the other side. The extended surface is adapted to fit within a cavity of the vehicle floor. When the reversible floor panel is mounted with its extended surface facing upwardly for added passenger comfort, the space between the planar surface and the floor cavity also forms a hidden compartment for use by a passenger. The reversible floor panel may also be formed with an extended flange along one end that enables a footrest shape to be present in both of the reversible positions.

4 Claims, 1 Drawing Sheet

REVERSIBLE VEHICLE FLOOR PANEL

BACKGROUND OF THE INVENTION

The present invention relates generally to vehicle interior compartments, and specifically to an assembly for adjusting the relative floor height of a vehicle.

The rear seat of a passenger vehicle is typically fixed in relationship to the floor of the vehicle. While the back section of the rear seat may be constructed to fold down or the rear section of the seat constructed to fold forward, the rear seat of a passenger vehicle is generally designed to provided a single, fixed seating position. Similarly, the floor of a passenger vehicle is typically formed to provide a fixed, yet contoured surface upon which carpet is overlaid. Floor mats are also typically provided to protect the carpeting in the vehicle. Nevertheless, passengers riding in the back of a vehicle may vary considerably in their height. While the bottom section of the rear seat could be constructed with a power adjustment mechanism to vary the relative height of the rear seat to the floor surface, such a mechanism would undoubtedly affect the cost of the vehicle to the consumer. However, it would still be desirable to find a way to achieve a relative height adjustment to enhance the comfort and convenience features provided by the vehicle.

Accordingly, it is a principal objective of the present invention to provide an assembly for adjusting the relative floor height of a vehicle that will only have an insignificant impact on the cost of the vehicle to the consumer.

It is another objective of the present invention to provide an assembly for adjusting the relative floor height of a vehicle that is capable of being completely hidden.

It is a further objective of the present invention to provide an assembly for adjusting the relative floor height of a vehicle that is capable of performing more than one function.

SUMMARY OF THE INVENTION

In order to achieve the foregoing objectives, the present invention provides a reversible floor panel for the rear seat compartment area of a passenger vehicle. The reversible floor panel is formed with a planar surface on one side and a vertically extended surface on the other side. The extended surface is adapted to fit within a cavity of the vehicle floor. When the reversible floor panel is mounted with its extended surface facing upwardly, the space between the planar surface and the floor cavity also forms a hidden compartment for use by one or more passengers in the vehicle.

In one form of the present invention, the reversible floor panel is formed with a generally flat surface on one side and raised surface on the other side. The raised surface may be either planar or formed to provide a footrest shape. The raised surface may also be formed to be detachable from the floor panel substrate, so as to provide an additional hidden compartment. The reversible floor panel may also be replicated on the other side of the vehicle using the identical parts. The reversible floor panel may also be formed with an extended flange along one end that enables a footrest shape to be present in both of the reversible positions.

Additional features and advantages of the present invention will become more fully apparent from a reading of the detailed description of the preferred embodiment and the accompanying drawings in which:

DETAILED DESCRIPTION OF THE PREFERRED EMBODIMENT

Figure 1:
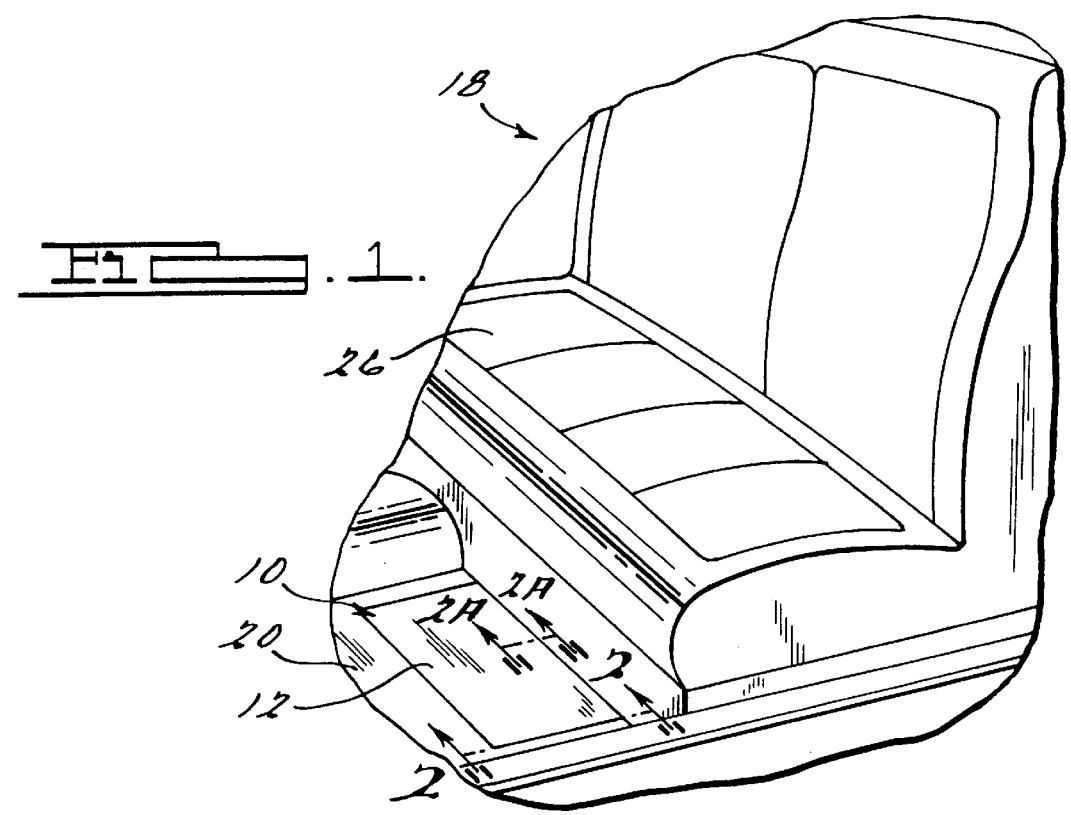
FIG. 1 shows a perspective view of a rear seat area of a vehicle having a reversible floor panel assembly according to the present invention.
Figure 2:
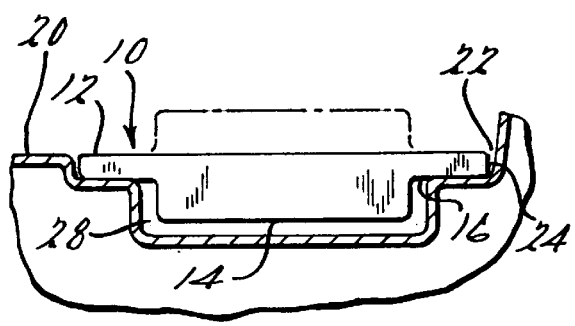
FIG. 2 shows a diagrammatic view of the reversible floor panel according to the present invention.

Referring generally to FIGS. 1 and 2, a reversible floor panel assembly 10 according to the present invention is shown. The reversible floor panel 10 is formed with a planar surface 12 on one side and a vertically extended surface 14 on the opposite side. In a preferred form of the present invention, the planar surface 12 is larger than the extended surface 14, such that the planar surface forms a flange 16 along at least two opposite ends of the panel 10. However, it should be understood that the flange 16 could extend completely around the panel 10 in the appropriate application.

As Shown in FIG. 1, the panel 10 is located in the rear seat area of the vehicle 18. The planar surface 12 preferably lines up with a top surface 20 of the floor of the vehicle 18. Most preferably, the planar surface 12 and the top surface 20 share a common horizontal line. A gap 22 between the planar surface 12 and the top surface 20 may be provided to more easily enable the panel 10 to be removed or reversed in orientation relative to the vehicle's floor. In one form of the present invention, gap 22 is provided along a portion of the rearward facing edge 24 of the panel 10. As indicated by the dotted line in FIG. 2, the panel 10 is designed to be reversible, so that the extended surface 14 may be faced upwardly. In this position, the extended surface 14 will be at an elevation that is above the elevation of the top surface 20 of the vehicle floor. In this way, the vertical dimension of the extended surface 14 may be used to adjust the relative floor height of the rear seat area in the vehicle 18. In one form of the present invention, both the planar surface 12 and the extended surface 14 provided generally flat exterior surfaces for the panel 10. However, other suitable variations may be made, such as will be discussed in connection with FIGS. 3 and 4. Additionally, the extended surface 14 preferably has a polygon shape, such as a square or a rectangle. However, this shape may be adjusted to suit the particular design of the rear seat compartment of the vehicle 18.

The height of the extended surface 14 relative to the flange 16 may also be varied according to the present invention. In one embodiment herein, the height is preferably 1.25 inches. In is believed that this dimension will compensate for a difference of over one-foot in height of a passenger residing in the rear seat 26 of the vehicle 18. However, this height dimension may be larger or smaller, such as 0.75 inches or 2.5 inches. The width of the extended surface 14 should also be large enough to support the shoes or feet of a passenger riding in the rear or back seat 26 of the vehicle 18. For example, a width of 8.0 inches is believed to be sufficient to provide adequate support for passengers. The floor of the vehicle 18 must also be formed with a cavity 28 that is sufficiently deep to completely receive the extended surface 14 of the panel 10. As shown in FIG. 2, the shape of the cavity 28 may be formed to conform to the shape of the extended surface 14.

Figure 2A:
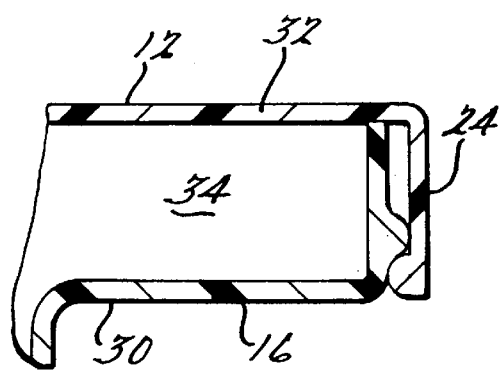
FIG. 2A is an enlarged cross-sectional view of a portion of the reversible floor panel shown in FIG. 2.

As illustrated in FIG. 2A, the panel 10 may be constructed of more than one integral part. In the embodiment shown, the panel 10 is constructed of two mating parts, namely a container 30 that forms the extended surface 14, and a lid 32 that forms the planar surface 12. Both of these parts may be made out of a variety of different types of materials. However, a plastic material, such as polypropylene is preferred due to its low cost, low weight and its resilience. While a snap-fit connection between these two parts is shown in FIG. 2A, it should be appreciated that other suitable techniques for removably coupling these two parts together may be provided. However, it is important to note that the flange 16 is formed such that the load will not be transferred to the lid area itself. The exterior surfaces of the container 30 and the lid 32 may be covered with carpeting that matches the carpeting provided in the vehicle's interior. It should also be noted from FIG. 2A that the interior 34 of the panel 10 could be used to store personal property, such as maps or coloring books. Similarly, the cavity 28 forms another hidden compartment when the extended surface of the panel 10 is facing upwardly.

Figure 3:
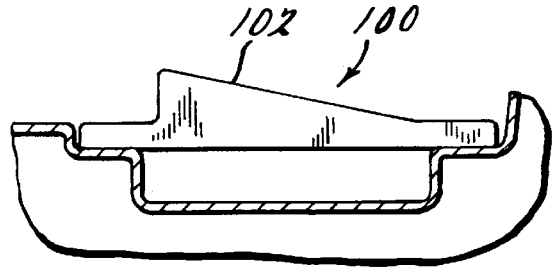
FIG. 3 shows a diagrammatic view of a second embodiment according to the present invention.

Referring to FIG. 3, a diagrammatic view of another reversible floor panel 100 according to the present invention is shown. In this embodiment, the panel 100 is formed with an extended surface 102 that is shaped to slant downwardly toward the rear seat. In this way, the panel 100 may be adapted to provide a footrest for a rear seat passenger. The taper or angle of the extended surface may be varied in the appropriate application. However, in one form of the present invention, the angle is preferably between 15 and 25 degrees relative to a horizontal orientation.

Figure 4:
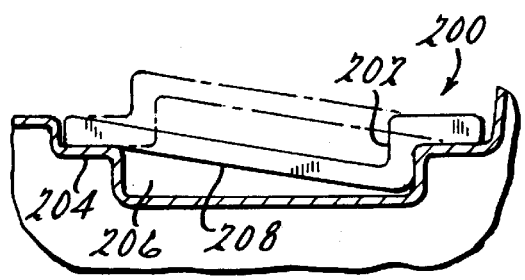
FIG. 4 shows a diagrammatic view of a third embodiment according to the present invention.

Referring to FIG. 4, a diagrammatic view of yet another reversible floor panel 200 according to the present invention is shown. In this embodiment, the panel 200 may be more appropriately formed from a single piece of polypropylene and covered completely with carpeting. The panel 200 is formed to provide a footrest shape in both of the reversible positions. This unique ability is achieved through the use of a single flange 202 that is formed along one end of the panel, such that the flange provides a vertical extension for the panel 200. When the flange 202 of the panel 200 is positioned adjacent the rear seat 26 of the vehicle 18, the rearward end of the panel will be below the top surface 20 of the vehicle floor and at least a portion of the flange 202 will be received in a cavity 206 of the vehicle floor. However, when the flange 202 of the panel 200 rests in a corresponding flange 204 of the cavity 206 in the vehicle floor, the forward end of the panel will be vertically above the top surface 20 of the vehicle floor. In this position, the vertically extending flange 202 will cause the flat surface 208 of the panel to slope downwardly toward the rear seat. In either case, the panel 200 will provide the passengers with a sloping footrest. The height of the footrest may be varied simply by flipping over (or reversing) the panel 200 and facing the flange 202 toward or away from the rear seat, as illustrated by the dotted line in FIG. 4.

The present invention has been described in an illustrative manner. It should be evident that modifications may be made to the specific embodiments described herein without departing from the spirit of the present invention. Such modifications are to be considered within the scope of the present invention, which is limited solely by the scope and spirit of the appended claims.

What is claimed is:

1. An assembly for adjusting the relative interior floor height of a portion of a passenger vehicle passenger interior, comprising:

a reversible floor panel assembly having a first planar panel on one side and a second planar panel, on an opposite side of said floor panel assembly, said first and second planar panels being spaced generally vertically apart from one another, the area of said first planar panel being greater than the area of said second planar panel to form a flange along at least one edge of said floor panel assembly, said flange being substantially coplanar with said first planar panel, and the vertical thickness of said first planar panel and said flange being substantially equal to one another, said floor panel assembly having at least one generally vertical wall interconnecting said first and second planar panels adjacent said flange; and a floor of said passenger vehicle passenger interior having a cavity formed therein for receiving said second planar panel and said vertical wall of said reversible floor panel assembly when said reversible floor panel assembly is placed over said cavity with said first planar panel facing upwardly, said floor further having a recess formed therein generally adjacent said cavity for receiving said flange when said floor panel assembly is placed over said cavity with said first planar panel facing upwardly and for receiving said flange when said floor panel assembly is reversed with said first planar panel facing downwardly, and the vertical depth of said recess being approximately equal to the thickness of said first planar panel and said flange.

2. The assembly according to claim 1, wherein said first and second planar panels are detachably interconnected with one another and form a generally hollow storage compartment therebetween.

3. The assembly according to claim 1, wherein said first and second planar panels are generally parallel with one another.

4. The assembly according to claim 1, wherein said first and second planar panels are non-parallel with respect to one another.

* * * * *